United States Patent Office 2,856,029
Patented Oct. 14, 1958

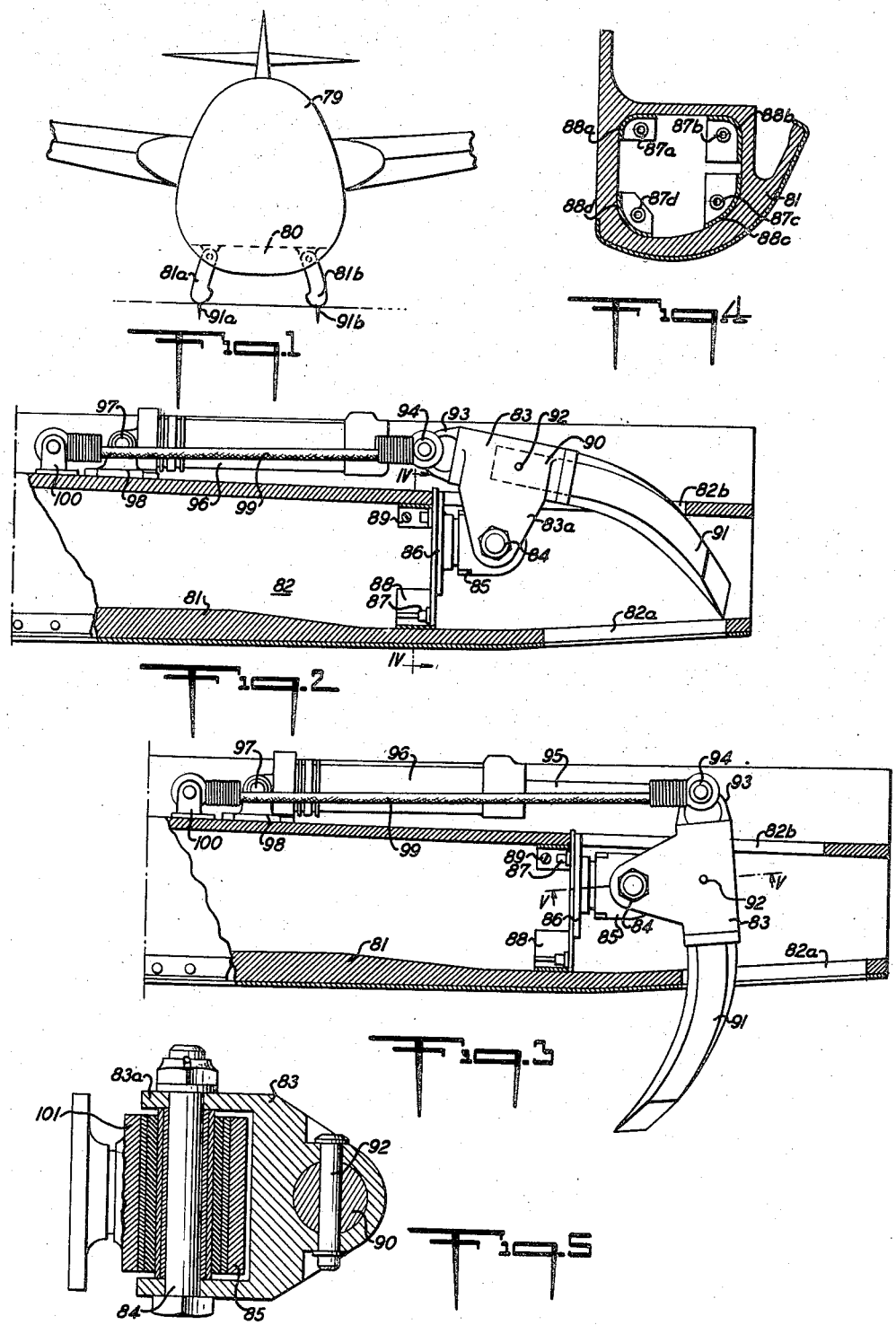

2,856,029

BRAKING DEVICE FOR VEHICLES MOVING OVER NATURAL GROUND

Georges Jules Bernard Victor Hereil and Wsiewolod John Jakimiuk, Paris, France, assignors to Sud-Aviation Societe Nationale de Constructions Aeronautiques, Paris, France Application October 7, 1953, Serial No. 384,642

Claims priority, application France October 27, 1952

3 Claims. (Cl. 188—6)

This invention relates to vehicle braking devices.

In certain technical fields and more particularly in aeronautics, apparatus or vehicles designed to roll or slip over the natural ground, not covered with concrete or the like, are used. Thus, aircraft fitted with landing skids or skis may land directly on the natural ground, the purpose of these skids or skis being to reduce the landing run through their frictional engagement with the natural ground which develops a substantial retarding or braking action. In the following description the word "ground" will be used in lieu of natural ground, for the sake of simplicity.

Similarly, in tactical fields which have appeared more recently with the development of supersonic or nearly supersonic flying speeds, carriages propelled at relatively high velocity and adapted to roll directly over the ground have been used for launching aircrafts, these carriages being equipped with conventional braking devices actuated when the aircraft takes off from the carriage.

However, on the one hand, the retarding effect of skids or skis is insufficient to reduce the landing run to satisfactory limits and, on the other hand, the devices utilized up to now for braking and stopping the aforesaid launching carriages are not fully satisfactory and moreover they are intricate and costly, while their reliability in all cases is questionable.

In view of avoiding the drawbacks listed hereabove, the main object of the present invention is to provide a braking device for vehicles or other apparatus moving directly over the ground, characterized by the fact that it operates through penetration into and frictional engagement with the ground, without deteriorating the ground on which the vehicle or other device is caused to move, this combined action of penetration in and frictional engagement with the ground developing an efficient braking effect.

According to a particularly advantageous embodiment of this invention, the braking and stopping device contemplated therein comprises one or a plurality of sharp-pointed members (called spikes or blades in this description for simplification) which, when it is desired to brake the vehicle or other device in motion, dig or penetrate into the ground. Each spike consists of a relatively thin blade, preferably of steel. The spike blade is preferably slightly curved and is formed with a sharp ground-engaging end so that the whole of the spike may penetrate the ground; preferably, each spike is so shaped as to have two faces substantially parallel with the direction of motion of the vehicle and which are joined at the front through symmetrical bevels forming a cutting edge. This relatively thin blade, provided with side faces, i. e., faces parallel with its direction of motion, engages the ground while compressing laterally the earth as it progresses therein, thereby increasing the friction exerted on its parallel faces.

According to the invention, the spike or spikes are mounted on a pivoted supporting member operatively connected to a control device adapted to retract them into the vehicle or like device outside the braking period, and to lower them rapidly when the brake application is to take place. The spike or spikes are preferably interchangeable and adapted to be removed from their supporting member by using a quick-release holding device.

It is another object of this invention to use a braking device of the type broadly disclosed hereinabove, notably for braking a carriage of the type used for launching one or more aircrafts for example, an aircraft having a relatively low ground-clearance, with or without central keel, or an aircraft equipped with landing skids or skis. This blade braking device may be actuated either singly or in combination with the other braking systems normally mounted on the device to be braked.

Other features and advantages of this invention will appear as the following description proceeds with reference to the accompanying drawings forming part of the specification and showing by way of example the manner in which the invention may be carried out in the practice. In the drawings:

Figure 1 is a diagrammatical front view of an aircraft equipped with landing skis in their lowered position, provided with a braking device according to this invention.

Figures 2 and 3 are sectional views showing the rear portion of a ski equipped with a braking device according to the invention, in its retracted and operative positions respectively.

Figure 4 is a section taken upon the line IV—IV of Figure 2.

Figure 5 is a section taken upon the line V—V of Figure 3.

If, in an aircraft having a low ground clearance, the fuselage is provided with a reinforced central girder of the type described in the U. S. patent application Serial No. 346,582, filed April 3, 1953, now Patent No. 2,779,558, by same applicant for: "Improvements in the Fuselages of Aerodynes," it is advantageous to mount pivotally on a common horizontal axis at right angles to the longitudinal plane of the aircraft two symmetrical hoe assemblies disposed on either side of the girder, respectively.

In this case, the central hoe assembly or the pair of symmetrical lateral hoe assemblies are controlled directly by the pilot through a control device of the type illustrated in Figs. 2 and 3 of the accompanying drawings.

Figures 1 to 5 illustrate a practical application of the braking and stopping device according to this invention to an aircraft equipped with a ski landing gear of the type described in the U. S. patent application Serial No. 341,267, filed March 9, 1953, now Patent No. 2,741,446, for: "Improvements in or Relating to Aircraft Landing Gears." In the bottom of the hull of an aircraft 79 (Fig. 1), there is provided beneath the floor a hold 80 in which a pair of landing skids 81a and 81b are located when the aircraft is flying. Each skid 81 is formed with an inner recess 82 adapted to receive in its rear portion the braking device in its inoperative condition. This device comprises a socket member 83 formed with a strap 83a hingedly mounted on a pin 84 carried by a supporting member 85 secured through its base portion 86 on screw-threaded sockets 87 welded on sectional elements 88 corresponding in shape to the recess 82 and fastened to the walls thereof through screws 89 (Figs. 2 to 4).

To improve the resiliency of the assembly, the pin 84 is mounted in the supporting member 85 by means of a resiliently articulating device 101, such as the device known under the trade-mark "Silentbloc."

The socket member 83 has mounted therein the shank 90 of a curved hoe spike 91 having however the same cross-sectional profile as the spikes 30 mounted on the take-off carriage. This shank 90 is retained in the socket member 83 by means of a gudgeon pin 92 held against axial movement by split pins or like means. Moreover, the socket member 83 at its end opposite to the blade or spike 91 is formed with a strap portion 93 in which a pin 94 is mounted as shown; this pin 94 has pivotally mounted thereon the rod 95 of a ram 96 of which the cylinder is pivotally mounted, in turn, on a pin 97 carried by a supporting member 98 secured to the upper wall of the recess 82. In addition, the pin 94 has attached thereto one end of an elastic cord 99 the other end of which is anchored to a supporting member 100 also secured to the upper wall of the recess 82.

When the aircraft has landed on its landing skids, the pilot controls the hydraulic rams 96 to move the spikes 91 from their retracted position in the skid, as shown in Fig. 2, through the apertures 82a and 82b of the skid 81, to a position in which the spikes are more or less engaged into the ground. The pilot, as in the case of wheel brake control, acts either symmetrically on both spikes, or differentially on one or the other spike of the braking device, which in the latter case is used as a parking brake system for directing the aircraft on the ground. In its retracted position, each spike 91 is held by its elastic cord 99.

There will now be obvious to those skilled in the art many modifications and variations of the structure set forth which do not depart essentially from the spirit of the invention as defined in the following claims.

What is claimed is:

1. A braking device for aircraft equipped with ski-landing gear of the type including hollow skids with ground-contacting surfaces, comprising, for each skid, a support fixed inside the hollow skid, a socket member pivoted intermediate its ends on the support about a substantially horizontal axis perpendicular to the longitudinal plane of symmetry of the aircraft, said socket member comprising a tailpiece extending above the hollow skid and a dagger-shaped blade curved in a plane substantially parallel to the direction of travel and having a pointed tip and a forward cutting edge and mounted in said socket member to extend below said hollow skid in braking position, a return device mounted on the hollow skid and pivoted on the tailpiece for retracting said support and blade rearwardly within the hollow skid, and a pilot-operated control mounted on the hollow skid and pivoted on the tailpiece for rapidly lowering said blade outside of the skid with the skid contacting the ground by pivotal movement relative to said support to a position wherein the concave part of the curve of said blade is directed forwardly with respect to the direction of travel of the aircraft, said ground contacting surfaces being effective to limit the penetration of said lowered blades into the ground.

2. A device as in claim 1 wherein each blade has two side faces in planes substantially parallel to the direction of travel of the aircraft and two symmetrical bevels connecting said side faces at the forward line to define said cutting edge.

3. A device as in claim 1 wherein said return device comprises a tensioned resilient member.

References Cited in the file of this patent

UNITED STATES PATENTS

| | | |
|---|---|---|
| 876,475 | Morgan | Jan. 14, 1908 |
| 990,473 | Corbeau | Apr. 25, 1911 |
| 1,153,745 | Allen | Sept. 14, 1915 |
| 1,159,720 | Simpson | Nov. 9, 1915 |
| 1,215,902 | Bright | Feb. 13, 1917 |
| 1,405,658 | Bazzeghin | Feb. 7, 1922 |
| 1,548,084 | Zukoski | Aug. 4, 1925 |
| 1,562,795 | Sauveur | Nov. 24, 1925 |
| 1,724,188 | Garris | Aug. 13, 1929 |
| 2,276,310 | James | Mar. 17, 1942 |
| 2,319,297 | Cieri | May 18, 1943 |
| 2,507,774 | Foley | May 16, 1950 |

FOREIGN PATENTS

| | | |
|---|---|---|
| 172,360 | Germany | June 20, 1906 |